(No Model.)

J. T. WELCH & D. A. DREYFUS.
THILL COUPLING.

No. 532,996. Patented Jan. 22, 1895.

WITNESSES:
John A. Rennie
H. B. Hutchinson

INVENTORS
J. T. Welch
D. A. Dreyfus
BY Munn & Co.
ATTORNEYS.

UNITED STATES PATENT OFFICE.

JAMES T. WELCH AND DAVID A. DREYFUS, OF L'ARGENT LANDING, LOUISIANA.

THILL-COUPLING.

SPECIFICATION forming part of Letters Patent No. 532,996, dated January 22, 1895.

Application filed July 28, 1894. Serial No. 518,805. (No model.)

*To all whom it may concern:*

Be it known that we, JAMES T. WELCH and DAVID A. DREYFUS, of L'Argent Landing, in the parish of Tensas and State of Louisiana, have invented a new and Improved Thill-Coupling, of which the following is a full, clear, and exact description.

Our invention relates to improvements in couplings such as are used to couple thills or poles to the axle of a vehicle; and the object of our invention is to produce a very cheap and simple coupling, which does away with the necessity of using a bolt or bolts, which holds the thills in a very secure manner, and which may be instantly coupled or uncoupled.

To these ends our invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
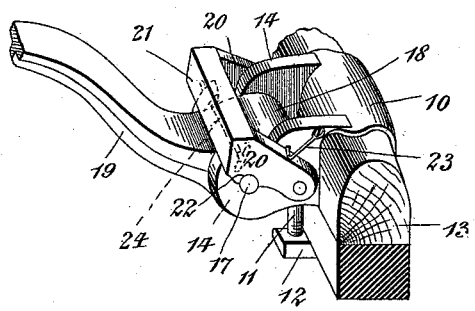
Figure 2:
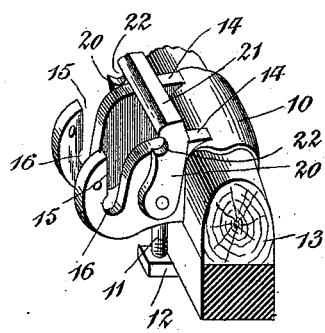
Figure 3:
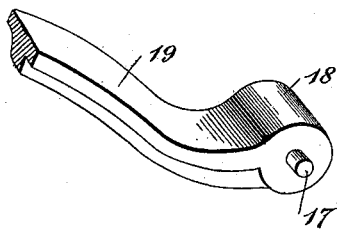

Figure 1 is a perspective view of the coupling embodying our invention, showing it in locked position. Fig. 2 is a perspective view of the open coupling with the thill iron removed; and Fig. 3 is a detail perspective view of the thill iron.

The coupling has the clip 10, which is of substantially the usual kind, having the customary terminal bolts 11 and cross piece 12, which enables it to be clamped to the axle 13, and the coupling has also forwardly projecting parallel lugs or arms 14 which are notched in their upper edges and near their outer ends, as shown at 15 in Fig. 2, so as to form them into hooks capable of receiving the trunnions of the thill iron, as described presently, and the notches 15 are rounded out near the bottom, as shown at 16, in order that the trunnions 17 on the knuckle 18 of the thill iron 19 may fit snugly in them. The trunnions 17 may be formed on the thill iron knuckle by driving a pin through the knuckle, or they may be made integral with the knuckle or in any convenient way, but the knuckle and iron 19 are of substantially the usual kind.

The thill iron and knuckle are held in place in the coupling by a latch comprising the side arms 20 which are pivoted on the outer sides of the lugs 14, and a cross bar 21 connecting the free ends of the arms and adapted to swing down over the ends of the lugs 14, as shown clearly in Fig. 1. The side arms 20 of the latch have notches 22 in them, adapted to register with the rounded portions 16 of the notches 15 and fit over the trunnions 17, thus holding them in place and forming a bearing for them. The latch is pressed downward into engagement with the trunnions 17 by a spring 23 which is secured to one of the lugs 14 and presses down on one of the side arms 20 of the lugs, but if desired a pin 24, shown by dotted lines in Fig. 1, may be substituted for the spring and made to extend through the arms 20 and lugs 14, or any other suitable fastening may be used.

It will be seen that to remove the thill iron from the coupling it is only necessary to lift the latch, and remove the trunnions 17 from the notches 15, and to effect the coupling, the trunnions are simply dropped into the notches and the latch turned down.

Having thus described our invention, we claim as new and desire to secure by Letters Patent—

1. A thill coupling, comprising an axle clip having forwardly-projecting parallel lugs thereon with notches in the upper edges of the lugs, and a latch fulcrumed on the lugs and provided with a cross bar adapted to swing down over the ends of the lugs, substantially as described.

2. A thill coupling, comprising an axle clip having forwardly-projecting parallel lugs thereon with notches in the upper edges of the lugs, and a latch pivoted on the lugs, and provided with a cross bar to swing over the ends of the lugs, the side arms of the latch having notches to register with the notches in the lugs, substantially as described.

JAMES T. WELCH.
DAVID A. DREYFUS.

Witnesses:
CHAS. WISE,
B. GOLDBUG.